US012445406B2

(12) United States Patent
Martini et al.

(10) Patent No.: US 12,445,406 B2
(45) Date of Patent: Oct. 14, 2025

(54) DIFFERENTIATED NETWORK SERVICES USING MAP-T TRANSLATION TECHNOLOGY

(71) Applicant: Charter Communications Operating, LLC, St. Louis, MO (US)

(72) Inventors: Luca Martini, Lakewood, CO (US); Erez Jordan Gottlieb, Denver, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 436 days.

(21) Appl. No.: 17/682,542

(22) Filed: Feb. 28, 2022

(65) Prior Publication Data
US 2023/0275867 A1    Aug. 31, 2023

(51) Int. Cl.
*H04L 61/2503*    (2022.01)
*H04L 9/40*    (2022.01)
(Continued)

(52) U.S. Cl.
CPC .......... *H04L 61/2503* (2013.01); *H04L 61/10* (2013.01); *H04L 63/0892* (2013.01); *H04L 69/22* (2013.01); *H04L 2101/659* (2022.05)

(58) Field of Classification Search
CPC . H04L 61/2503; H04L 61/10; H04L 63/0892; H04L 69/22; H04L 2101/659
See application file for complete search history.

(56) References Cited

U.S. PATENT DOCUMENTS 8,180,388 B1 *    5/2012   Ghaus ................... H04W 28/26
                                                          455/434
10,817,269 B2    10/2020   Martini et al.
(Continued)

OTHER PUBLICATIONS

Rimra et al., "A Model of Customer Premises Equipment for Internet Protocol Version 6", International Journal of Innovation, Management and Technology, vol. 4, No. 6, DOI: 10.7763/IJIMT.2013.V4.468, pp. 594-598, Dec. 2013.
(Continued)

*Primary Examiner* — Dhairya A Patel
*Assistant Examiner* — Sujana Khakural
(74) *Attorney, Agent, or Firm* — Young Basile Hanlon & MacFarlane, P.C.

(57) ABSTRACT

Methods and systems for providing differentiated network services using Mapping of Address and Port using translation (MAP-T) technology are described. A method includes provisioning a service specific IPv6 network prefix and a service specific basic mapping rule to an access device, the service specific IPv6 network prefix associated with a differentiated network service level, provisioning a service specific mapping rule to a border relay, identifying by the access device service packets associated with the differentiated network service level, translating by the access device the identified service packets to the service specific IPv6 network prefix using the service specific basic mapping rule to generate service specific packets, forwarding the service specific packets to the border relay via a service provider network, translating return packets to service specific return packets using the service specific mapping rule, and forwarding the service specific return packets to the access device.

16 Claims, 8 Drawing Sheets

(51) Int. Cl.
*H04L 61/10* (2022.01)
*H04L 69/22* (2022.01)
*H04L 101/659* (2022.01)

(56) References Cited

U.S. PATENT DOCUMENTS

| | | | |
|---|---|---|---|
| 2013/0301650 A1* | 11/2013 | Zou | H04L 61/2514 |
| | | | 370/467 |
| 2016/0014071 A1* | 1/2016 | Asati | H04L 61/251 |
| | | | 709/245 |
| 2016/0057788 A1* | 2/2016 | Sharma | H04M 15/66 |
| | | | 370/329 |
| 2017/0012873 A1* | 1/2017 | Berg | H04L 61/251 |
| 2018/0048567 A1* | 2/2018 | Ignatchenko | H04L 47/56 |
| 2018/0248842 A1* | 8/2018 | Araújo | H04L 61/4511 |
| 2019/0281013 A1* | 9/2019 | Bao | H04L 61/251 |
| 2021/0044521 A1* | 2/2021 | Holbrook | H04L 45/507 |
| 2022/0038310 A1* | 2/2022 | Boutros | H04L 67/1004 |

OTHER PUBLICATIONS

Popoviciu et al., "Deploying IPV6 Networks", Cisco Press, ISBN: 1-58-705210-5, pp. 175-205, Feb. 10, 2006.

\* cited by examiner

DIFFERENTIATED NETWORK SERVICES USING MAP-T TRANSLATION TECHNOLOGY

TECHNICAL FIELD

This disclosure relates to network services. More specifically, this disclosure relates to providing differentiated network services using Mapping of Address and Port using translation (MAP-T) technology.

BACKGROUND

Service providers provide services to customers over networks, which can include wireless and wired networks. The services can be provided at a default service level or quality of service (QOS) (collectively "service level") or at different service levels. For example, the different service levels can include, but is not limited to, increased speed, low latency service, greater bandwidth, or combinations thereof. In the uplink direction (subscriber originated traffic), a service level can be determined or selected based on device type, user, source, or combinations thereof, for example. Traffic in the uplink direction can then be labeled and identified for multiple service levels. In the downlink direction (return direction), tracking service levels based on a per device or user would require maintaining millions of classifiers. This presents multiple issues. Tracking at this level becomes unsustainable from a scaling perspective. In addition, tracking is a stateful service from a service provide perspective, which can be expensive and inefficient for an increasingly greater numbers of users.

SUMMARY

Disclosed herein are methods and systems for providing differentiated network services using Mapping of Address and Port using translation (MAP-T) technology.

In implementations, a method includes provisioning a service specific IPv6 network prefix and a service specific basic mapping rule to an access device, the service specific IPv6 network prefix associated with a differentiated network service level, provisioning a service specific mapping rule to a border relay, identifying by the access device service packets associated with the differentiated network service level, translating by the access device the identified service packets to the service specific IPv6 network prefix using the service specific basic mapping rule to generate service specific packets, forwarding the service specific packets to the border relay via a service provider network, translating return packets to service specific return packets using the service specific mapping rule, and forwarding the service specific return packets to the access device.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
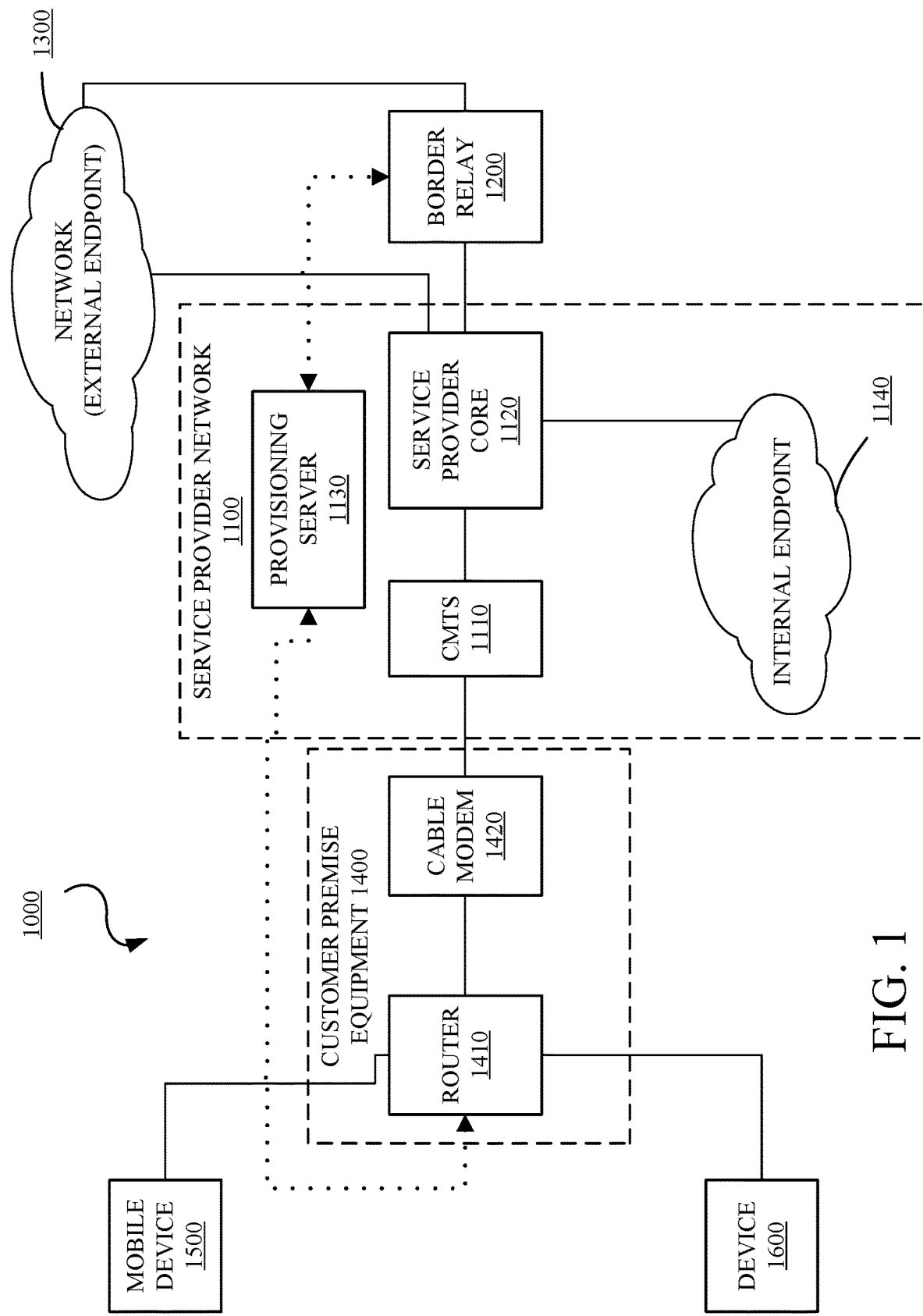
FIG. 1 is a diagram of an example network in accordance with embodiments of this disclosure.

Reference will now be made in greater detail to embodiments of the invention, examples of which are illustrated in the accompanying drawings. Wherever possible, the same reference numerals will be used throughout the drawings and the description to refer to the same or like parts.

As used herein, the terminology "computer", "computing device", or "computing platform" includes any unit, or combination of units, in a distributive platform, centralized platform, or combinations thereof, capable of performing any method, or any portion or portions thereof, disclosed herein. For example, the "computer" or "computing device" may include at least one or more processor(s).

As used herein, the terminology "processor" indicates one or more processors, such as one or more special purpose processors, one or more digital signal processors, one or more microprocessors, one or more controllers, one or more microcontrollers, one or more application processors, one or more central processing units (CPU) s, one or more graphics processing units (GPU) s, one or more digital signal processors (DSP) s, one or more application specific integrated circuits (ASIC) s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks or activities. For example, applications may perform one or more functions including, but not limited to, telephony, web browsers, e-commerce transactions, media players, travel scheduling and management, smart home management, entertainment, and the like. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is unless specified otherwise, or clear from context, "X includes A or B" is intended to indicate any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, manufactures, and/or compositions of matter, while eliminating for the purpose of clarity other aspects that may be found in typical similar devices, systems, compositions and methods. Those of ordinary skill may thus recognize that other elements and/or steps may be desirable or necessary to implement the devices, systems, compositions and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

Networking and internetworking communication protocols are relied upon to carry data through the networks. The Internet Protocol (IP) is the principal communications protocol in the Internet protocol suite for relaying and routing packets across the networks from a source to a destination. It describes the format of packets, the addressing scheme, and other specifications for network and computing devices to communicate over the network. Internet Protocol Version 4 (IPv4) is the fourth revision of the IP. IPv4 uses a 32-bit address scheme allowing for a total of $2^{32}$ IP addresses, where each IP address is a numerical label assigned to a device connected to the network. The IP address is a unique identifier for a device and each device needs its own IP address. The rapid development of the Internet has reached a point where most IPv4 addresses have already been distributed. This rapid growth of Internet data traffic is requiring service providers to allocate more and more of their limited IPv4 IP address inventory to high speed data subscribers prior to completion of the service provider's migration to the expanded address space enabled with Internet Protocol Version 6 (IPv6), which is the sixth revision of the IP and uses a 128-bit address, theoretically allowing $2^{128}$ IP addresses.

IPv6 transition technology facilitates the transitioning of the Internet from the IPv4 infrastructure to the IPv6 networks since IPv4 and IPv6 are not directly interoperable. Mapping of Address and Port using translation (MAP-T) is an IPv6 transition technology that allows IPv4 addresses to be translated into IPv6 without the need for stateful translation on the service provider network. This enables service providers the ability to leverage IPv6 only networks to co-exist with IPv4-only devices on the subscriber's network in a manner that has minimal impact on the user experience. The MAP-T mode uses the stateless IP/ICMP translation algorithm (SIIT) to convert IPv4 headers into IPv6 headers and follows stateless translation rules defined in RFC 6145. MAP-T assigns a port range to the CPEs that share the same public IPv4 address. This allows the address and port range combination that is translated in the IPv6 header to be represented uniquely. In this way, IPv6 aggregation logic can be used to direct packets in a stateless fashion, rather than relying upon per-subscriber or per-connection criteria to determine state.

Described herein are methods and systems for using MAP-T to provide differentiated network services. In some implementations, the described techniques use the MAP-T translation technology to create bidirectional indicators which identify traffic of specific services or sets of devices associated with non-default or differentiated network service levels. A service specific IPv6 prefix delegation (PD) is used by a customer premise equipment (CPE) to obtain service specific IPv6 network prefix(es) (i.e., the bidirectional indicators) and allocate service specific IPv6 addresses to devices using one or more specific services. For IPv4 service traffic, the PD, is used for MAP-T translation of the IPv4 service traffic toward a border relay (BR) or internal destinations with respect to a service provider. The CPE uses a service specific MAP-T basic mapping rule (BMR) to map the IPv4 service traffic to the service specific IPv6 network prefix and forward the same to the BR or internal destination. In some implementations, the BR implements a stateless IPv6 to IPv4 translation function and forwards the traffic to the internet destination. The return traffic goes back though a BR. The BR translates from IPv4 to IPv6 and forwards same to the CPE that is using the service specific MAP-T mapping rules. Any devices in the service provider access or core network can easily identify the traffic by the service specific IPv6 network prefix and classify the traffic accordingly. Advantageously, MAP-T, as opposed to tunnel techniques, is a low cost and stateless implementation in a service provider network. State information is maintained in a subscriber's CPE.

In some implementations, a CPE device acting as an IPv4 and IPv6 router requests an IPv6 prefix delegation for each special network service that the CPE needs to offer. Once the request is authenticated and authorized, a Dynamic Host Configuration Protocol (DHCP) server or equivalent server delegates the service specific IPv6 network prefix(es) to the CPE. The CPE will automatically install a pre-provisioned service specific BMR for each special or differentiated network service. Service specific mapping rules are installed or provisioned on border relays (noting that the provisioning is done on a per service basis or at an aggregation layer or level and not a per CPE basis, which could lead to scaling issues similar to that discussed herein). The CPE can identify service traffic associated with differentiated network service levels by determining or identifying, for example, a port number, a destination address, special private IP address allocated to the device using the service, other authentication, authorization, and accounting (AAA) techniques, or combinations thereof. The CPE is provisioned with a source network address translation (SNAT) protocol or function to map a private IP address to the IP address used by the BMR for the specific service.

Given the above configuration, traffic that is identified by the CPE as service specific traffic is processed through network address translation (NAT) protocols, translated using the BMR, and forwarded in an IPv6 packet to the border relay or internal destination. In implementations, the IPv6 traffic is translated by a border relay into IPv4 packets and forwarded to the next router or network hop toward the destination. Once the reply comes back from the destination, the reply IPv4 packet is translated to the IPv6 packet (for example, using the service specific mapping rule at a border relay) and forwarded toward the CPE. At the CPE, the reply IPv6 packet is translated using the BMR to an IPv4 packet and processed through the NAT protocols to the private IP address used by the device instantiating the special network service. Identification and treatment as a special service while in transit in the service provider network is readily available due to the presence of the service specific IPv6 network prefix. In implementations, cable modem termination systems (CMTS) and border relays can be provisioned to set a diffserv code point (DSCP) bit to a specific value for that service. Because the border relay has a stateless translation configured for each service (i.e., it is mapping rules based), the border relay can set the return traffic DSCP bit to the same service specific value. Although CMTS is used in the descriptions herein, other subscriber edge devices or edge compute devices including, but not limited to, broadband network gateways (BNG) are within the scope of the disclosure and the claims. The disclosure and the claims are applicable to various access technologies, including, but not limited to, data over cable service interface specification (DOCSIS) access technology, Digital Subscriber Line (DSL) access technology, Passive Optical Network (PON) access technology, and/or combinations thereof.

The methods and systems described herein require no per user state in the service provider network. This results in high scalability and low cost. The use of MAP-T enables conservation of IPv4 addresses by using oversubscription ratio of private IPv4 to public IPv4 addresses (e.g., 1 public IPv4 for 1024 CPEs). No tunnel encapsulation is used. The method employs translation of IP headers using supported network operation and protocols.

FIG. 1 is a diagram of an example network 1000 in accordance with some embodiments of this disclosure. The network 1000 includes a service provider network 1100, a border relay 1200, a network 1300, customer premise equipment (CPE) 1400, a mobile device 1500, and a device 1600. The service provider network 1100, the border relay 1200, the network 1300, the customer premise equipment (CPE) 1400, the mobile device 1500, and the device 1600 can be connected to or be in communication with (collectively "connected to") each other and use, as appropriate and applicable, wired and wireless techniques, systems, and devices, including but not limited to, hybrid coaxial fiber, coaxial fiber, the Internet, an intranet, wide area networks (WANs), a low power WAN (LPWAN), local area networks (LANs), a public network, a private network, a cellular network, a WiFi-based network, a telephone network, a landline network, a public switched telephone network (PSTN), a wireless network, a wired network, a private branch exchange (PBX), an Integrated Services Digital Network (ISDN), an IP Multimedia Services (IMS) network, a Voice over Internet Protocol (VOIP) network, data over cable service interface specification (DOCSIS) access technology, Digital Subscriber Line (DSL) access technology, Passive Optical Network (PON) access technology, and the like including any combinations thereof. The network 1000 and the components therein may include other elements which may be desirable or necessary to implement the devices, systems, compositions, and methods described herein. However, because such elements and steps are well known in the art, and because they do not facilitate a better understanding of the disclosed embodiments, a discussion of such elements and steps may not be provided herein.

The service provider network 1100 can provide services including, but not limited to, internet services, voice services, wireless services, broadband services, high speed data services, cable, Internet, Voice over Internet Protocol service, and wired services, to consumers and subscribers ("subscribers") via appropriate CPEs 1400. The services can be provided at or with different service levels as described herein. The service level provided by the service provider network 1100 can depend on, for example, device type, service type, source type, and other factors. The service provider network 1100 can include a cable modem termination system (CMTS) 1110, a service provider core 1120, and a provisioning server 1130. The service provider network 1100 can further include one or more internal endpoints 1140 which can be destinations for communications by the mobile device 1500 and/or the device 1600. For example, the internal endpoints 1140 can be an on premise content delivery network. The service provider network 1100 and the components therein may include other elements which may be desirable or necessary to implement the devices, systems, compositions, and methods described herein. However, because such elements and steps are well known in the art, and because they do not facilitate a better understanding of the disclosed embodiments, a discussion of such elements and steps may not be provided herein.

The CMTS(s) 1110 are typically located in a service provider's central office, headend, or hubsite and provide services to subscribers via appropriate CPEs 1400. The number of CMTS is illustrative.

The service provider core 1120 can include multiple network components including, but not limited to, routers, switches, communications components, wireless network components, and wired network components, which provide and/or enable services to subscribers.

The provisioning server 1130 or network management server can be used by a service provider to monitor, control, analyze, and manage the service provider network 1100 and to support management functions such as service provisioning and/or network configuration. The provisioning server 1130 can delegate, provision, configure, or initiate configuration of one or more border relays 1200, one or more CPEs 1400, other network devices, or combinations thereof as described herein. The provisioning server 1130 can provision MAP-T BMR rules or mapping rules, as device appropriate, for each differentiated network service. The provisioning server 1130 can include DHCP or DHCPv6 functionality to provision or delegate service specific IPv6 network prefix(es) for each differentiated network service to the CPEs 1400. In some implementations, each different service specific IPv6 network prefix is part of a service specific aggregation. In some implementations, the provisioning server 1130 provisions service specific aggregation based mapping rules (i.e., aggregation classifier rules) to the border relays 1200.

The border relay 1200 can be provisioned with service specific mapping rules to translate and transfer packets from an IPv4 domain to an IPv6 domain and from the IPv6 domain to the IPv4 domain in accordance with the IPv6 network prefix(es). The service specific IPv6 prefix(es) act as bidirectional indicators or identifiers as the IPv6 packet traverses the service provider network 1100 and enables appropriate service levels or QoS for the differentiated network service. Although the description herein uses border relays, the scope of the specification and claims are applicable to network devices provisioned with MAP-T including, but not limited to, border relays, border routers, and like devices. The number of border relays is illustrative. There can be multiple border relays proximate an edge of the service provider network 1100.

The network 1300 can be, but is not limited to, hybrid coaxial fiber, coaxial fiber, the Internet, an intranet, a low power WAN (LPWAN), LANs, WANs, a public network, a private network, a cellular network, a WiFi-based network, a telephone network, a landline network, a public switched telephone network (PSTN), a wireless network, a wired network, a private branch exchange (PBX), an Integrated Services Digital Network (ISDN), a IP Multimedia Services (IMS) network, a Voice over Internet Protocol (VOIP) network, and the like including any combinations thereof. In implementations, the network 1300 can be an IPv4 based network. In implementations, the network 1300 can be a combination of an IPv4 based network and an IPv6 based network, where packets coming out of the network 1300 and entering the network 1300 are IPv4 packets. The network 1300 is external to the service provider network 1100 and accessible via one or more border relays such as the border relay 1200. In this sense, the network 1300 represents an external endpoint for services relative to the mobile device 1500 and the device 1600.

The CPE 1400 can be, but is not limited to, routers, network switches, gateways, set-top boxes, fixed mobile convergence products, home networking adapters and Internet access gateways that enable customers to access a service provider's services and distribute them in a residence, enterprise, office, or like infrastructure. In implementations, the CPE 1400 can be equipment located at a customer's premises and connected with a service provider's network 1100 and/or telecommunication equipment, including for example, CMTS 1110. In implementations, CPE 1400 can be provisioned with MAP-T BMR rules for each differentiated network service as described herein. In implementations, the CPE 1400 can request, from the provisioning server 1130, an IPv6 prefix delegation for each special network service that the CPE 1400 needs to offer. The provisioning server 1130 can delegate the service specific IPv6 network prefix(es) to the CPE 1400 after successful authentication and authorization. The CPE 1400 can automatically install a pre-provisioned service specific BMR for each special, differentiated, or differentiated DOCSIS network service or service class. The number of CPEs is illustrative. There may be multiple CPEs connected to a CMTS.

In implementations, the CPE 1400 can include or be a router 1410 and cable modem 1420. The router 1410 can distribute the service provider network connection to and from subscriber devices such as the mobile device 1500 and the device 1600. The cable modem 1420 can connect the router 1410 to the service provider network 1100. The router 1410 can be provisioned with MAP-T BMR rules for each differentiated network service as described herein. In implementations, the router 1410 can request, from the provisioning server 1130, an IPv6 prefix delegation for each special network service that the router 1410 needs to offer. The provisioning server 1130 can delegate the service specific IPv6 network prefix(es) to the router 1410 after successful authentication and authorization. The router 1410 can automatically install a pre-provisioned service specific BMR for each special, differentiated, or differentiated DOCSIS network service or service class. The CPE 1400 and the router 1410 can be collectively referred to as access devices.

In implementations, the CPE 1400 and/or the router 1410 can have or include an IPv4 address (referred to, for example, as "PUBLICa" in the example operational description) that will be used by the CPE 1400 and/or the router 1410 for network address port translation (NAPT) processing for ordinary traffic or traffic not designated as differentiated network services. The CPE 1400 and/or the router 1410 can have or include one or more service specific IPv6 prefix(es) with associated MAP-T BMR(s). That is, the service specific IPv6 prefix(es) is utilized for MAP-T and has no native utilization. That is, in an example implementation, no addresses associated with the delegated prefix(es) are assigned to devices or subscribers connected to the CPE 1400 and/or the router 1410. In this configuration, a dual stacking configuration is used for the CPE 1400 and/or the router 1410. A service specific IPv6 prefix(es) utilized for MAP-T is stacked with the IPv4 address to transport IPv4 traffic even though the CPE 1400 and/or the router 1410 already has an assigned IPv4 address for this purpose. The number of service specific IPv6 prefix(es) with MAP-T BMRs stacked with the IPv4 address is tied to the number of differentiated network services needed by the CPE 1400 and/or the router 1410 for the subscriber devices. The service specific IPv6 prefix(es) act as bidirectional indicators or identifiers as the IPv6 packet traverses the service provider network 1100 and enables appropriate service levels or QoS for the differentiated network service. In implementations, the CPE 1400 and/or the router 1410 may have or include a standard IPv6 address. In the operational description, for example, the assigned service specific IPv6 prefix with associated MAP-T BMR result in IPv4 address and port mapping value of "MAPtPUBLICbPORTSb".

The mobile device 1500 can be, but is not limited to, end user devices, cellular phones, Internet Protocol (IP) devices, mobile computers, laptops, handheld computers, personal media devices, smartphones, notebooks, notepads, and the like. In the operational description, the mobile device 1500 is associated with a IPv4 address of x.y.z.b.

The device 1600 can be, but is not limited to, mobile devices, smart appliances, desktops, smart devices, and the like. In the operational description, the mobile device 1500 is associated with a IPv4 address of x.y.z.a.

The number of mobile device 1500 and device 1600 is illustrative. There can be multiple user devices connected to a CPE or router.

Figure 2:
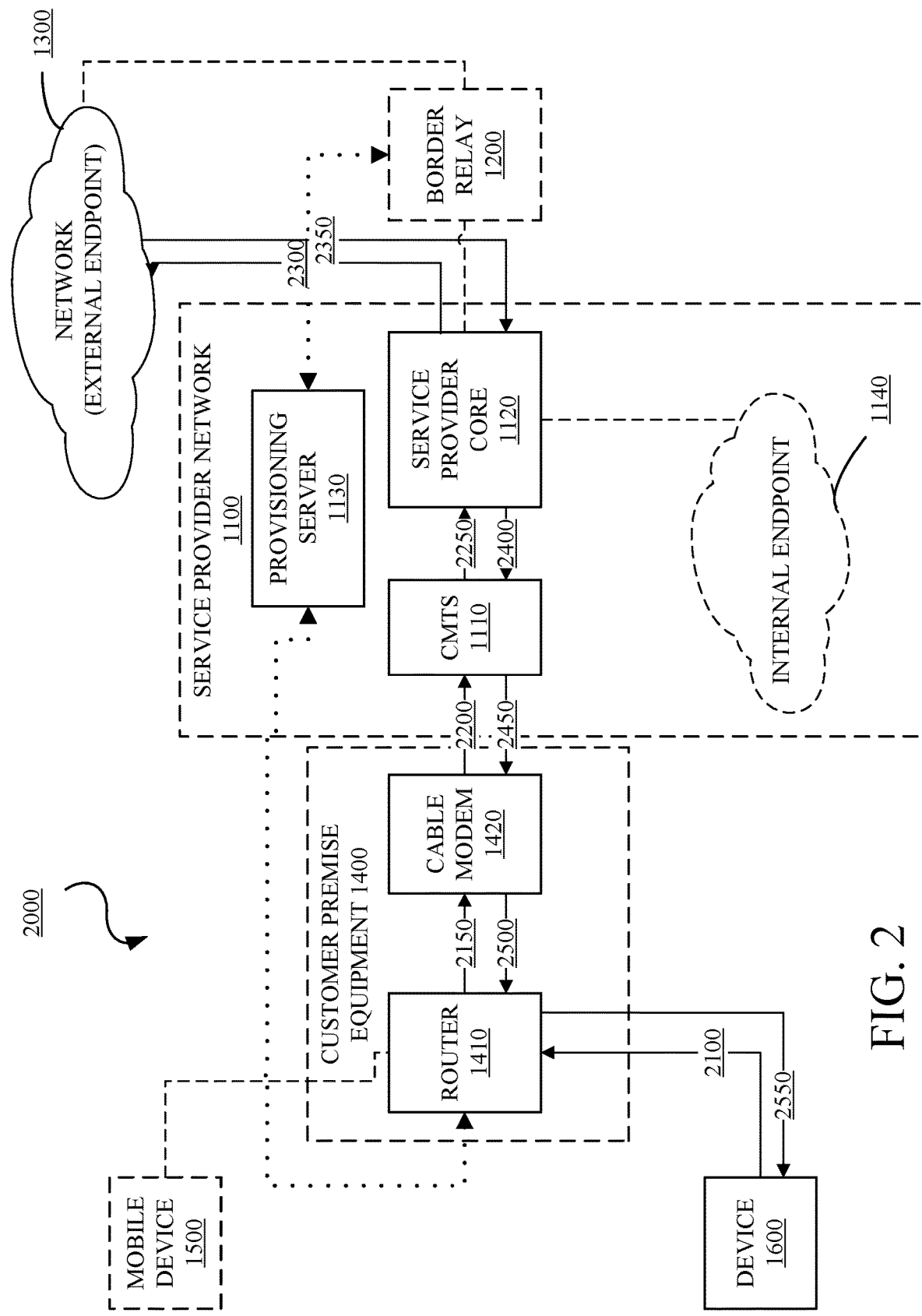
FIG. 2 is a diagram of an example flow using the network of FIG. 1 in accordance with embodiments of this disclosure.
Figure 3:
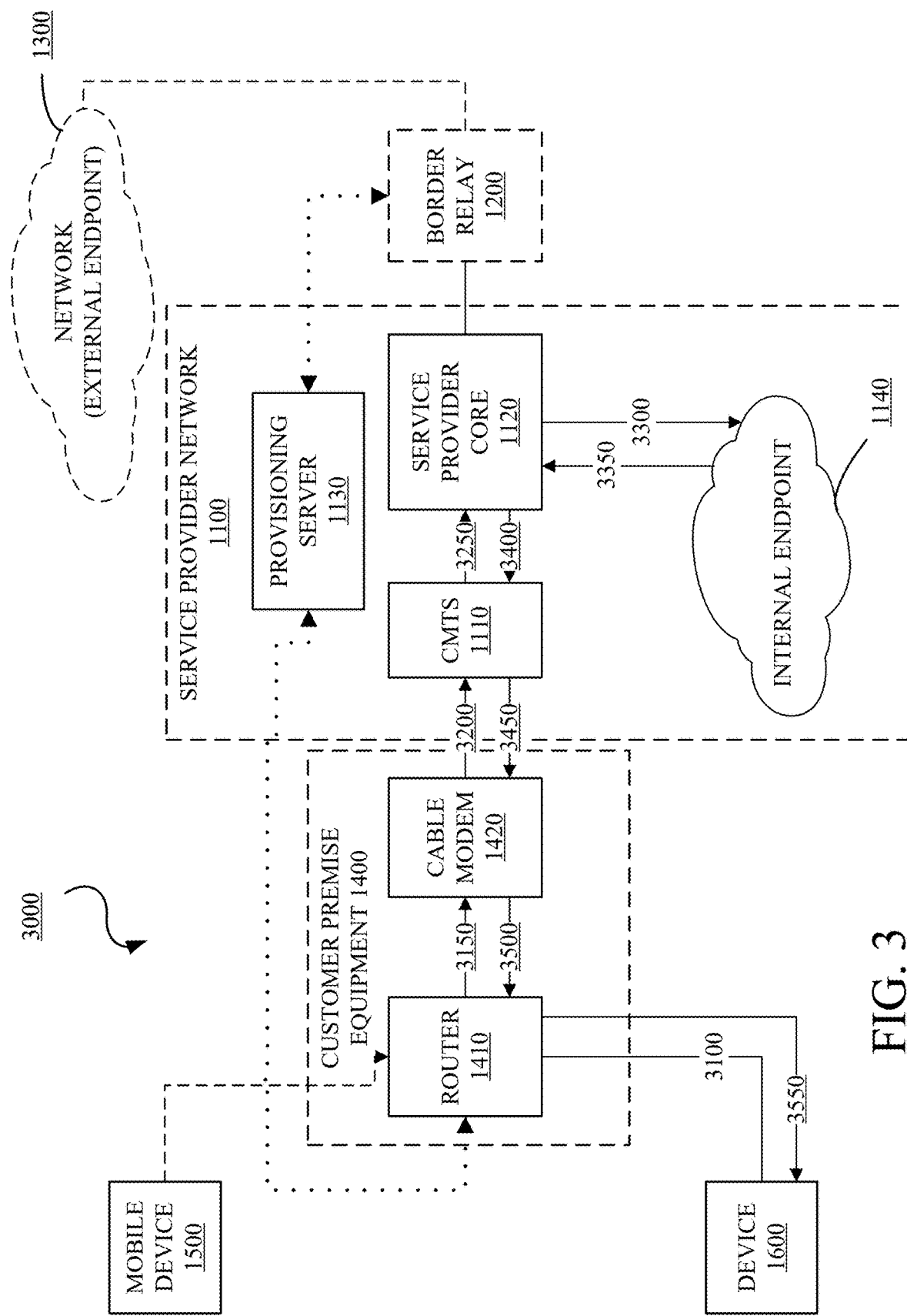
FIG. 3 is a diagram of an example flow using the network of FIG. 1 in accordance with embodiments of this disclosure.
Figure 4:
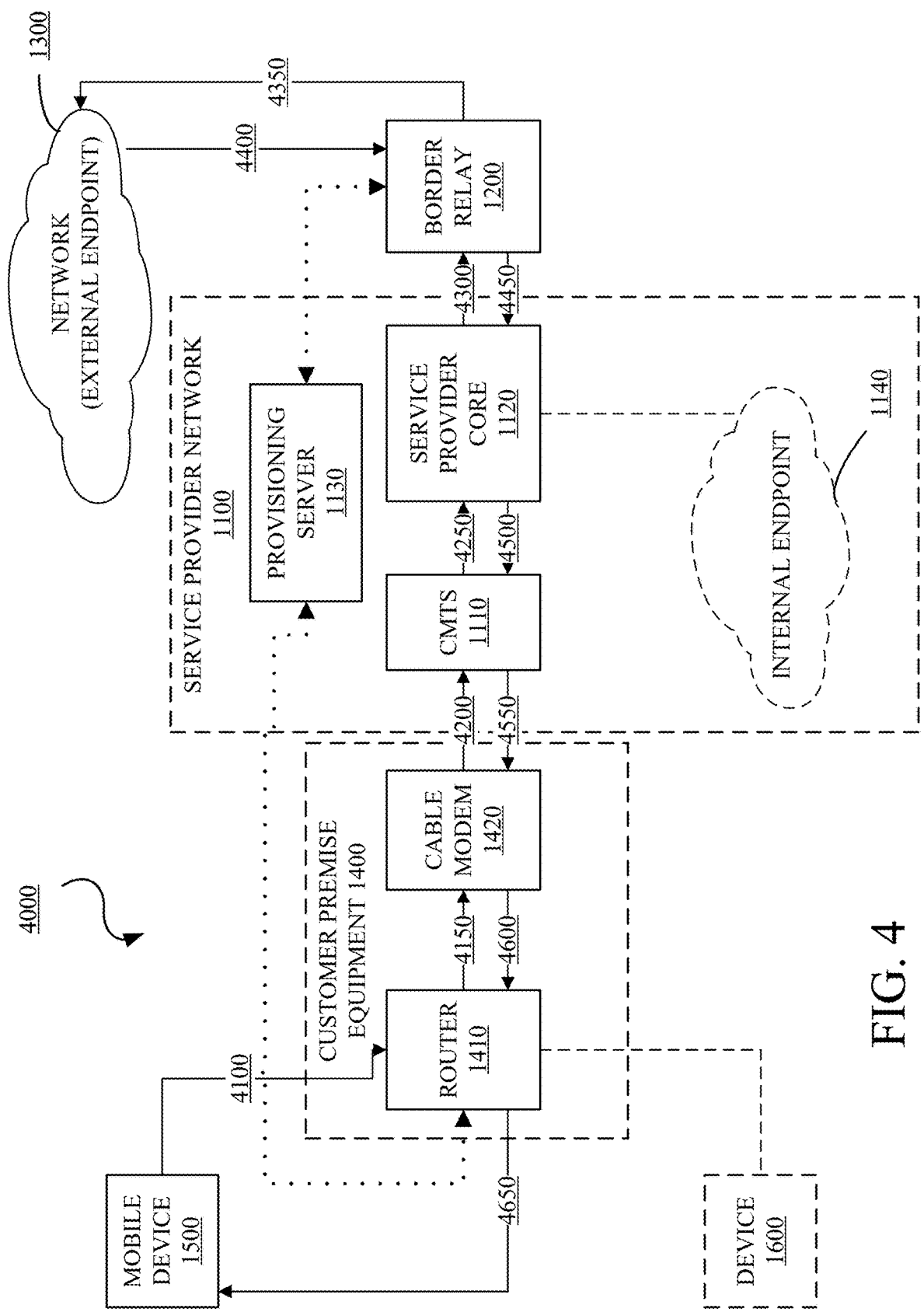
FIG. 4 is a diagram of an example flow using the network of FIG. 1 in accordance with embodiments of this disclosure.
Figure 5:
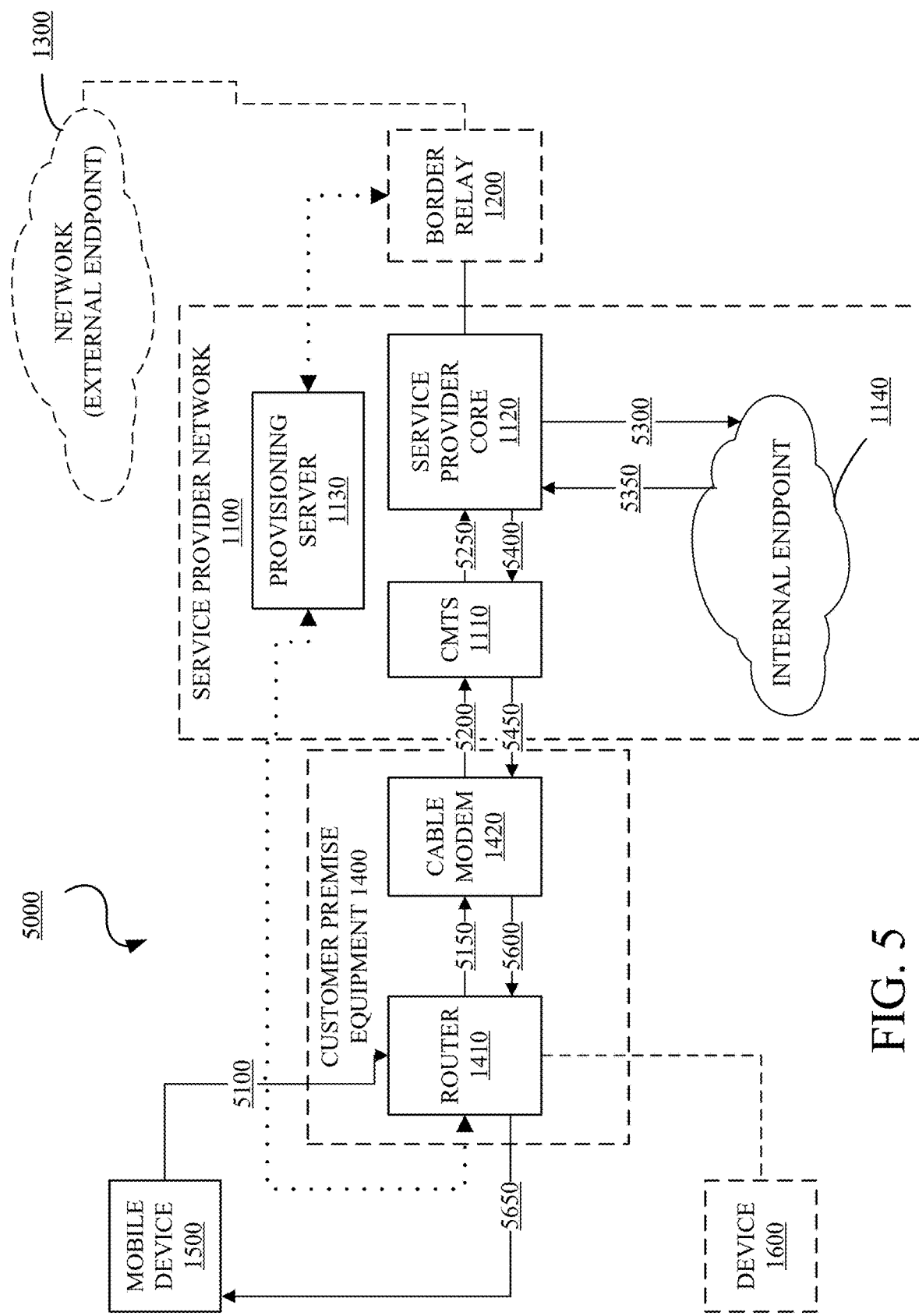
FIG. 5 is a diagram of an example flow using the network of FIG. 1 in accordance with embodiments of this disclosure.

The operational description is with respect to FIG. 1 and four example traffic flows as further shown in FIGS. 2-5. FIG. 2 is a diagram of an example flow 2000 using the network 1000 of FIG. 1 in accordance with embodiments of this disclosure. The flow 2000 is for standard non-differentiated service or default traffic flow to an external destination. FIG. 3 is a diagram of an example flow 3000 using the network 1000 of FIG. 1 in accordance with embodiments of this disclosure. The flow 3000 is for standard non-differentiated service or default traffic flow to an internal destination with respect to the service provider. FIG. 4 is a diagram of an example flow 4000 using the network 1000 of FIG. 1 in accordance with embodiments of this disclosure. The flow 4000 is for differentiated network service or service specific traffic flow to an external destination via a border relay. FIG. 5 is a diagram of an example flow 5000 using the network 1000 of FIG. 1 in accordance with embodiments of this disclosure. The flow 5000 is for differentiated network service or service specific traffic flow to an internal destination with respect to the service provider.

As stated, the flow 2000 is for standard non-differentiated service or default traffic flow to the external endpoint in the network 1300. The device 1600 initiates an IPv4 flow source x.y.z.a to a IPv4 destination service on the Internet, i.e., the external endpoint in the network 1300 (2100). A SNAT layer on the router 1410 performs a longest match operation on source x.y.z.a and determines a match with x.y.z, resulting in performing a NAPT process using the source address "PUBLICa" and forwarding the traffic or packet to the CM 1420 (2150). The CM 1420 uses the service group mapped to the basic performance tier subscribed to by the subscriber (i.e., default or standard service level or default best effort QoS behavior (collectively "default service level")) (2200). The CMTS 1110 forwards the traffic towards to the service provider core 1120 with the default service level (2250). The traffic is forwarded through the various hops of the service provider core 1120 with the default service level. The traffic exits the service provider core 1120 and eventually arrives at the IPv4 destination on the Internet (i.e., the external endpoint in network 1300) (2300). An IPv4 based Internet service at the external endpoint in network 1300 transmits return traffic or packets towards the originator (i.e., the device 1600) as part of the bidirectional flow through the service provider core 1120 (2350). The return traffic is forwarded through the various hops of the service provider core 1120 with the default service level. The return traffic is forwarded from the service provider core 1120 to the CMTS 1110 with default service level (2400). The CMTS 1110 uses the service class mapped to the basic performance tier subscribed to by the customer (i.e., default service level) (2450). The return traffic arrives at the router 1410 which performs a NAPT process (2500) in order to deliver the return traffic to the originating client (x.y.z.a) (i.e., the device 1600) (2550).

As stated, the flow 3000 is for standard non-differentiated service or default traffic flow to an internal destination (i.e., the internal endpoint 1140) with respect to the service provider network 1100. The device 1600 initiates an IPv4 flow source x.y.z.a to a IPv4 destination service within the service provider network 1100 such as internal endpoint 1140 (3100). A SNAT layer on the router 1410 performs a longest match operation on source x.y.z.a and determines a match with x.y.z, resulting in performing a NAPT process using the source address "PUBLICa" and forwarding the traffic or packet to the CM 1420 (3150). The CM 1420 uses the service group mapped to the basic performance tier subscribed to by the subscriber (i.e., default or standard service level or default best effort QoS behavior (collectively "default service level")) (3200). The CMTS 1110 forwards the traffic towards the service provider core 1120 with default service level (3250). The traffic is forwarded through the various hops of the service provider core 1120 with default service level. The traffic exits the service provider core 1120 and eventually arrives at the IPv4 destination within the service provider network 1100 (i.e., the internal endpoint 1140) (3300). An IPv4 based service at the internal endpoint 1140 transmits return traffic or packets towards the originator (i.e., the device 1600) as part of the bidirectional flow through the service provider core 1120 (3350). The return traffic is forwarded through the various hops of the service provider core 1120 with default service level. The return traffic is forwarded from the service provider core 1120 to the CMTS 1110 with default service level (3400). The CMTS 1110 uses the service class mapped to the basic performance tier subscribed to by the customer (i.e., default service level) (3450). The return traffic arrives at the router 1410 which performs a NAPT process (3500) in order to deliver the return traffic to the originating client (x.y.z.a) (i.e., the device 1600) (3550).

As stated, the flow 4000 is for differentiated network service or service specific traffic flow to the external destination 1300 via the border relay 1200. The device 1500 initiates an IPv4 flow source x.y.z.b to a IPv4 destination service on the Internet, i.e., the external endpoint in the network 1300 (4100). A SNAT layer on the router 1410 performs a longest match operation on source x.y.z.b and determines a match with x.y.z.b, which is explicitly defined (i.e., router 1410 identifies a service specific packet as described herein), resulting in performing a NAPT process using the source address and port set "MAPtPUBLICb-PORTSb." The IPv4 traffic or packet undergoes a MAP-T stateless translation to generate a service specific stacked IPv6 packet. That is, a service specific IPv6 network prefix associated with the specific service is used for the MAP-T translation. The service specific stacked IPv6 packet is forwarded to the CM 1420 (4150). The CM 1420 uses an enhanced or service specific service class or QoS behavior ("enhanced service level") based on the service specific IPv6 network prefix in the service specific stacked IPv6 packet. The CM 1420 puts the service specific stacked IPv6 packets into the correct service specific service flow based on the service specific IPv6 network prefix which governs what kind up upstream data capabilities the service specific stacked IPv6 packets gets, where a service flow is a unidirectional flow of packets that are guaranteed a particular bandwidth. The CMTS 1110 marks the service specific stacked IPv6 packets with differentiated services code point (DSCP) service class markings (4200). The CMTS 1110 forwards the service specific stacked IPv6 packet towards the service provider core 1120 with the enhanced service level (4250). The service specific stacked IPv6 packet is forwarded through the various hops of the service provider core 1120 with the enhanced service level. The traffic exits the service provider core 1120 and arrives on an IPv6 side of the border relay 1200 (4300). The border relay 1200 performs stateless translation from the service specific stacked IPv6 packet to an IPv4 packet and forwards the traffic so that it arrives at the IPv4 destination on the Internet (i.e., the external endpoint in network 1300) (4350). The DSCP marking are preserved at the border relay 1200. Polices in the network 1300 determine whether the DSCP markings are preserved after leaving the border relay 1200.

An IPv4 based Internet service at the external endpoint in network 1300 transmits return traffic or packets towards the originator (i.e., the device 1500) as part of the bidirectional flow, which arrives on an IPv4 side of a border relay such as border relay 1200 (although the same border relay is used herein, the return traffic can be received by any border relay proximate to an edge of the service provider network 1100). The return traffic will in most cases not have the correct DSCP markings at this point (4400). The border relay 1200 performs stateless translation from the IPv4 packet to a IPv6 return packet. In some implementations, the border relay 1200 can provide appropriate DSCP service class markings. The translated IPv6 return packet will belong to or be associated with a service specific stacked IPv6 address based on the applicable prefix. It is a stacked packet. In implementations, the border relay 1200 can apply the correct DSCP service class markings because the return traffic is destined to or associated with a service specific mapping rule that includes the DSCP or QoS information. The border relay 1200 forwards the IPv6 return packet with the appropriate DSCP service class markings (when applicable) through the service provider core 1120 (4450). The IPv6 return packet is forwarded through the various hops of the service provider core 1120 with the appropriate DSCP service class markings. The IPv6 return packet is forwarded through the service provider core 1120 to the CMTS 1110 (4500). Devices in the service provider core 1120 and the CMTS 1110 use enhanced service levels based on an aggregate IPv6 prefix classifier or DSCP service markings (4550). An aggregate IPv6 prefix classifier classifies using a parent (or aggregate) prefix that contains the particular service specific stacked IPv6 prefix. The return traffic arrives at the router 1410 which performs a MAP-T stateless translation and a NAPT process (4600) in order to deliver the return traffic to the originating client (x.y.z.b) (i.e., the device 1500) (4650).

As stated, the flow 5000 is for differentiated network service or service specific traffic flow to an internal destination (i.e., the internal endpoint 1140) with respect to the service provider network 1100. The device 1600 initiates an IPv4 flow source x.y.z.b to a IPv4 destination service within the service provider network 1100 such as internal endpoint 1140 (5100). A SNAT layer on the router 1410 performs a longest match operation on source x.y.z.b and determines a match with x.y.z.b, which is explicitly defined (i.e., router 1410 identifies a service specific packet as described herein), resulting in performing a NAPT process using the source address and port set "MAPtPUBLICbPORTSb." The IPv4 traffic or packet undergoes a MAP-T stateless translation to generate a service specific stacked IPv6 packet. That is, a service specific IPv6 network prefix associated with the specific service is used for the MAP-T translation. The service specific stacked IPv6 packet is forwarded to the to the CM 1420 (5150). The CM 1420 uses the enhanced service level based on the service specific IPv6 network prefix in the service specific stacked IPv6 packet. The CM 1420 puts the service specific stacked IPv6 packets into the correct service specific service flow based on the service specific IPv6 network prefix which governs what kind up upstream data capabilities the service specific stacked IPv6 packets gets, where a service flow is a unidirectional flow of packets that are guaranteed a particular bandwidth. The CMTS 1110 marks the service specific IPv6 network prefix with differentiated services code point (DSCP) service class markings (5200). The CMTS 1110 forwards the service specific stacked IPv6 packet towards to the service provider core 1120. The CMTS 1110 can use the enhanced service level or apply a default service level ("CMTS designated service level") (5250). The service specific stacked IPv6 packet is forwarded through the various hops of the service provider core 1120 with the CMTS designated service level. The service specific stacked IPv6 packet exits the service provider core 1120 and eventually arrives at the IPv4-mapped IPv6 addressed internal endpoint within the service provider network 1100 (i.e., the internal endpoint 1140) (5300).

The IPv4-mapped IPv6 addressed internal endpoint service 1140 transmits return traffic or packets towards the originator (i.e., the device 1500) as part of the bidirectional flow through the service provider core 1120. The IPv4-mapped IPv6 addressed internal endpoint service 1140 can QoS mark the return traffic as enhanced service level (using an aggregate IPv6 prefix which matches the client destination endpoint address) if the IPv4-mapped IPv6 addressed internal endpoint service 1140 desires other than default service level through the service provider core 1120 ("designated return service level") (5350). For example, the IPv4-mapped IPv6 addressed internal endpoint service 1140 can use a web service to access aggregates. The return traffic is forwarded through the various hops of the service provider core 1120 with the designated return service level. The return traffic is forwarded from the service provider core 1120 to the CMTS 1110 with the designated return service level (5400). The CMTS 1110 uses the enhanced service level based on an aggregate IPv6 prefix classifier or QOS marking if set by the IPv4-mapped IPv6 addressed internal endpoint service 1140 (5450). The return traffic arrives at the router 1410 which performs a MAP-T stateless translation and a NAPT process (5500) in order to deliver the return traffic to the originating client (x.y.z.b) (i.e., the device 1500) (5650).

Figure 6:
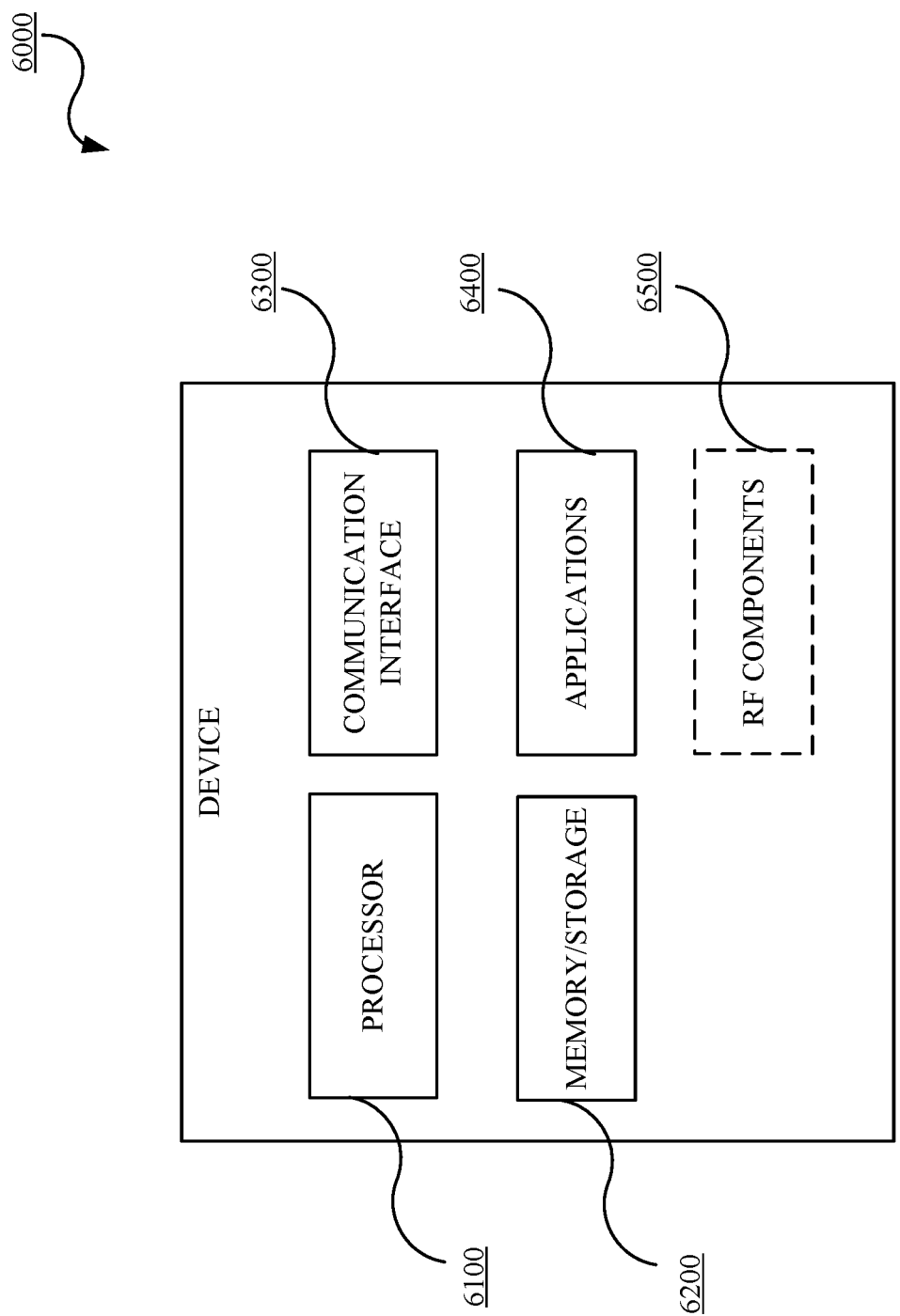
FIG. 6 is a block diagram of an example of a device in accordance with embodiments of this disclosure.

FIG. 6 is a block diagram of an example of a device 6000 in accordance with embodiments of this disclosure. The device 6000 can include, but is not limited to, a processor 100, a memory/storage 6200, a communication interface 6300, and applications 6400. The device 6000 may include a RF component 6500 for wireless operation. The device 6000 may include or implement, for example, the CMTS 1110, elements of service provider core 1120, the provisioning server 1130, devices at the internal endpoint 1140, border relay 1200, elements of network 1300 and external endpoint devices, CPE 1400, router 1410, modem 1420, mobile device 1500, and device 1600, as appropriate and applicable. In an implementation, appropriate memory/storage 6200 may store MAP-T BMRs and the like. In an implementation, appropriate memory/storage 6200 is encoded with instructions for at least controlling and managing provisioning of the service specific IPv6 network prefixes, MAP-T BMRs, mapping rules, and methods described herein. The techniques or methods described herein may be stored in appropriate memory/storage 6200 and executed by the appropriate processor 6100 in cooperation with the memory/storage 6200, the communications interface 6300, and the applications 6400, as appropriate. The device 6000 may include other elements which may be desirable or necessary to implement the devices, systems, and methods described herein. However, because such elements and steps are well known in the art, and because they do not facilitate a better understanding of the disclosed embodiments, a discussion of such elements and steps may not be provided herein.

Figure 7:
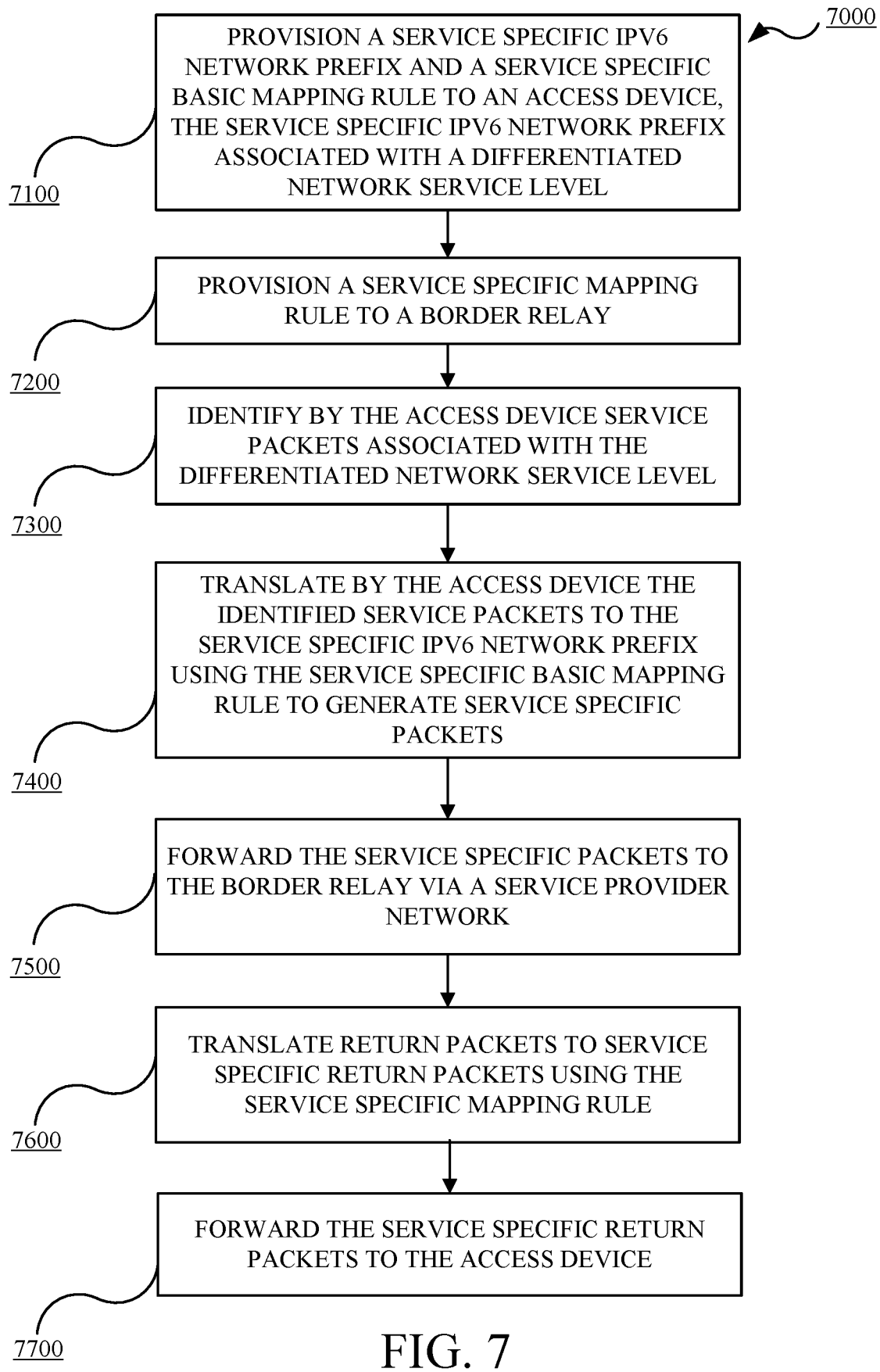
FIG. 7 is a flowchart of an example method for providing differentiated network services using MAP-T in accordance with embodiments of this disclosure.

FIG. 7 is a flowchart of an example method 7000 for providing differentiated network services using MAP-T in accordance with embodiments of this disclosure. The method 7000 includes: provisioning 7100 a service specific IPv6 network prefix and a service specific basic mapping rule to an access device, the service specific IPv6 network prefix associated with a differentiated network service level; provisioning 7200 a service specific mapping rule to a border relay; identifying 7300 by the access device service packets associated with the differentiated network service level; translating 7400 by the access device the identified service packets to the service specific IPv6 network prefix using the service specific basic mapping rule to generate service specific packets; forwarding 7500 the service specific packets to the border relay via a service provider network; translating 7600 return packets to service specific return packets using the service specific mapping rule; and forwarding 7700 the service specific return packets to the access device. For example, the method 7000 may be implemented, as applicable and appropriate, by the CMTS 1110, elements of service provider core 1120, the provisioning server 1130, devices at the internal endpoint 1140, border relay 1200, elements of network 1300 and external endpoint devices, CPE 1400, router 1410, modem 1420, mobile device 1500, device 1600, the processor 6100, the memory/storage 6200, the communication interface 6300, and the applications 6400.

The method 7000 includes provisioning 7100 a service specific IPv6 network prefix and a service specific basic mapping rule to an access device, the service specific IPv6 network prefix associated with a differentiated network service level, and provisioning 7200 a service specific mapping rule to a border relay. Subscriber devices send traffic or packets toward a destination via a service provider network, where the destination is external to the service provider network. Access devices such as a CPE or router provide access to the service provider network. For certain service traffic or packets, the service provider network can enable or provide differentiated network service levels. That is, enhanced service levels in contrast to a default or standard service level. The differentiated network service level is enabled by provisioning or delegating to the access device a service specific IPv6 prefix and associated BMR and provisioning to the border relay(s) a service specific mapping rule or service specific aggregation classifier. The service specific IPv6 prefix acts as a bidirectional identifier as the service packets travel through the service provider network.

The method 7000 includes identifying 7300 by the access device service packets associated with the differentiated network service level. The access device can identify service traffic associated with differentiated network service levels by determining or identifying, for example, a port number, a destination address, special private IP address allocated to the device using the service, other authentication, authorization, and accounting (AAA) techniques, or combinations thereof.

The method 7000 includes translating 7400 by the access device the identified service packets to the service specific IPv6 network prefix using the service specific basic mapping rule to generate service specific packets. The access device generates or creates a dual stack packet using the identified service packet and the service specific IPv6 network prefix. In implementations, the service specific packets are marked with differentiated services code point (DSCP) service class markings based on the service specific IPv6 network prefix. In implementations, an enhanced or service specific service class or QoS behavior ("enhanced service level") is used for the service specific packets based on the service specific IPv6 network prefix in the service specific packet. The service specific stacked IPv6 packets are placed into the correct service specific service flow based on the service specific IPv6 network prefix which governs what kind up upstream data capabilities the service specific packet gets, where a service flow is a unidirectional flow of packets that are guaranteed a particular bandwidth.

The method 7000 includes forwarding 7500 the service specific packets to the border relay via a service provider network. The border relay receives and translates the service specific packets for transmission to external endpoints.

The method 7000 includes translating 7600 return packets to service specific return packets using the service specific mapping rule. The border relay performs stateless translation from the IPv4 packet to a IPv6 return packet. The translated IPv6 return packet will belong to or be associated with a service specific stacked IPv6 address based on the applicable prefix. It is a stacked packet. In some implementations, the border relay can provide appropriate DSCP service class markings.

The method 7000 includes forwarding 7700 the service specific return packets to the access device. Devices in the service provider core and the CMTS use enhanced service levels based on an aggregate IPv6 prefix classifier or DSCP service markings. An aggregate IPv6 prefix classifier classifies using a parent (or aggregate) prefix that contains the particular service specific stacked IPv6 prefix. The return traffic arrives at a router which performs a MAP-T stateless translation and a NAPT process in order to deliver the return traffic to the originating client.

Figure 8:
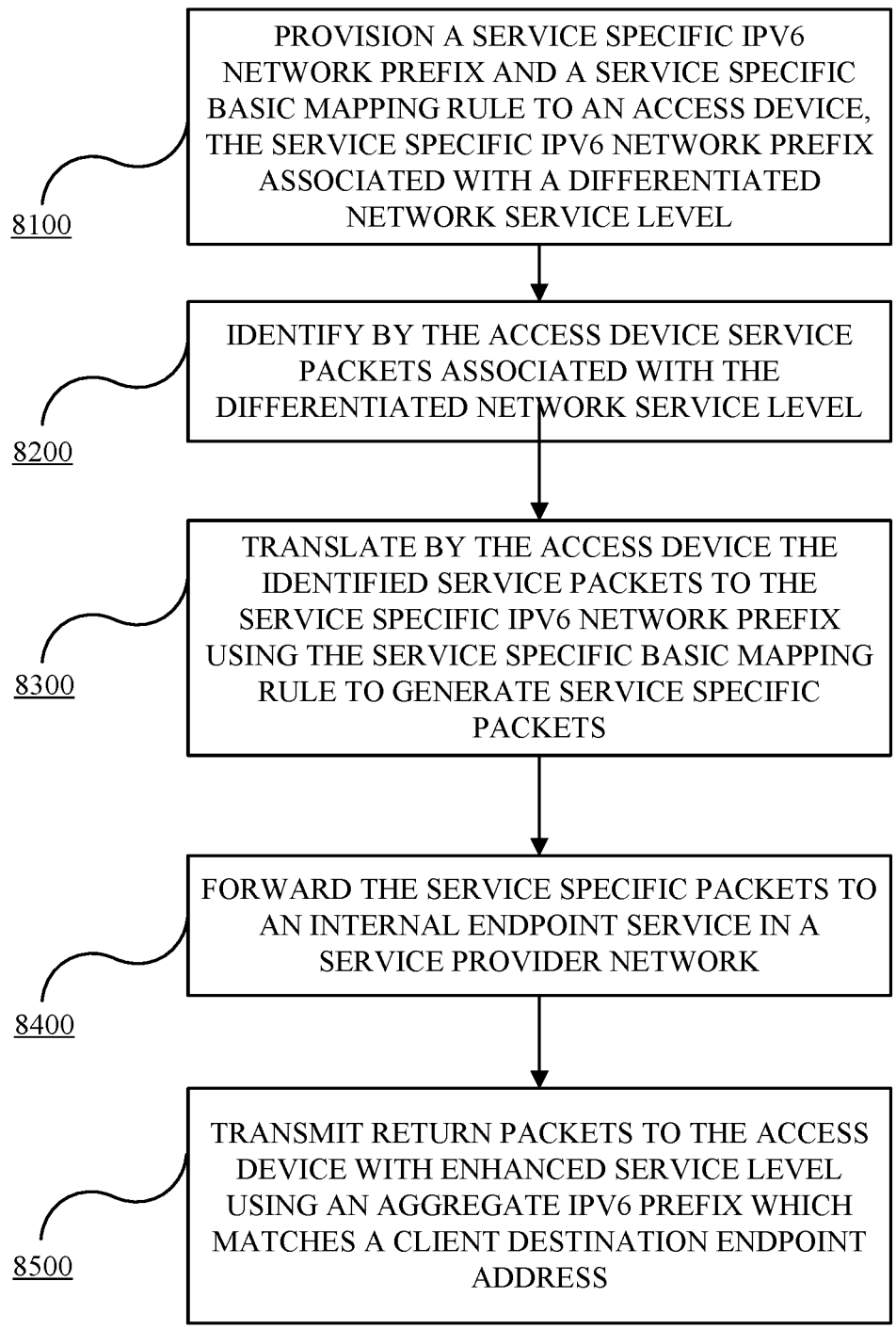
FIG. 8 is a flowchart of an example method for providing differentiated network services using MAP-T in accordance with embodiments of this disclosure.

FIG. 8 is a flowchart of an example method 8000 for providing differentiated network services using MAP-T in accordance with embodiments of this disclosure. The method 8000 includes: provisioning 8100 a service specific IPv6 network prefix and a service specific basic mapping rule to an access device, the service specific IPv6 network prefix associated with a differentiated network service level; identifying 8200 by the access device service packets associated with the differentiated network service level; translating 8300 by the access device the identified service packets to the service specific IPv6 network prefix using the service specific basic mapping rule to generate service specific packets; forwarding 8400 the service specific packets to an internal endpoint service in a service provider network; and transmitting 8500 return packets to the access device with enhanced service level using an aggregate IPv6 prefix which matches a client destination endpoint address. For example, the method 8000 may be implemented, as applicable and appropriate, by the CMTS 1110, elements of service provider core 1120, the provisioning server 1130, devices at the internal endpoint 1140, border relay 1200, elements of network 1300 and external endpoint devices, CPE 1400, router 1410, modem 1420, mobile device 1500, device 1600, the processor 6100, the memory/storage 6200, the communication interface 6300, and the applications 6400.

The method 8000 includes provisioning 8100 a service specific IPv6 network prefix and a service specific basic mapping rule to an access device, the service specific IPv6 network prefix associated with a differentiated network service level. Subscriber devices send traffic or packets toward a destination via a service provider network, where the destination is internal to the service provider network. Access devices such as a CPE or router provide access to the service provider network. For certain service traffic or packets, the service provider network can enable or provide differentiated network service levels. That is, enhanced service levels in contrast to a default or standard service level. The differentiated network service level is enabled by provisioning or delegating to the access device a service specific IPv6 prefix and associated BMR. The service specific IPv6 prefix acts as a bidirectional identifier as the service packets travel through the service provider network.

The method 8000 includes identifying 8200 by the access device service packets associated with the differentiated network service level. The access device can identify service traffic associated with differentiated network service levels by determining or identifying, for example, a port number, a destination address, special private IP address allocated to the device using the service, other authentication, authorization, and accounting (AAA) techniques, or combinations thereof.

The method 8000 includes translating 8300 by the access device the identified service packets to the service specific IPv6 network prefix using the service specific basic mapping rule to generate service specific packets. The access device generates or creates a dual stack packet using the identified service packet and the service specific IPv6 network prefix. In implementations, the service specific packets are marked with differentiated services code point (DSCP) service class markings based on the service specific IPv6 network prefix. In implementations, an enhanced or service specific service class or QoS behavior ("enhanced service level") is used for the service specific packets based on the service specific IPv6 network prefix in the service specific packet. The service specific stacked IPv6 packets are placed into the correct service specific service flow based on the service specific IPv6 network prefix which governs what kind up upstream data capabilities the service specific packet gets, where a service flow is a unidirectional flow of packets that are guaranteed a particular bandwidth.

The method 8000 includes forwarding 8400 the service specific packets to an internal endpoint service in a service provider network.

The method 8000 includes transmitting 8500 return packets to the access device with enhanced service level using an aggregate IPv6 prefix which matches a client destination endpoint address. Devices in the service provider core and the CMTS use enhanced service levels based on an aggregate IPv6 prefix classifier or DSCP service markings. An aggregate IPv6 prefix classifier classifies using a parent (or aggregate) prefix that contains the particular service specific stacked IPv6 prefix. The return traffic arrives at a router which performs a MAP-T stateless translation and a NAPT process in order to deliver the return traffic to the originating client.

In some implementations, a method for providing differentiated services using Mapping of Address and Port using translation (MAP-T) includes receiving, by an access device from a provisioning server, a service specific IPv6 network prefix and a service specific basic mapping rule, the service specific IPv6 network prefix associated with a differentiated network service level, receiving, by a border relay from the provisioning server, at least one of a service specific mapping rule or a service specific aggregation classifier associated with the differentiated network service level, identifying, by the access device, service packets associated with the differentiated network service level, translating, by the access device, the identified service packets to the service specific IPv6 network prefix using the service specific basic mapping rule to generate service specific packets, forwarding, by the access device, the service specific packets to the border relay, translating, by the border relay, return packets to service specific return packets using the service specific mapping rule or the service specific aggregation classifier and forwarding, by the border relay to the access device, the service specific return packets.

In some implementations, the service specific basic mapping rule is a MAPT-T basic mapping rule. In some implementations, the forwarding further includes traversing a service provider network between the access device and the border relay, wherein the service provider network provides an enhanced service level to the service specific packets due to the service specific IPv6 network prefix. In some implementations, the service specific IPv6 network prefix identifies the service specific packets for enhanced service levels as the service specific packets traverse a service provider network between the access device and the border relay. In some implementations, the identifying identifies at least one of a port number, a destination address, a special private IP address allocation, or by using authentication, authorization, and accounting (AAA) techniques. In some implementations, the service specific packets generating dual stack packets using the identified service packets and the service specific IPv6 network prefix. In some implementations, the method includes marking, by an edge device, the service specific packets with differentiated services code point (DSCP) service class markings based on the service specific IPv6 network prefix. In some implementations, a second occurrence of the translating further includes marking, by the border relay, the service specific packets with differentiated services code point (DSCP) service class markings based on the service specific IPv6 network prefix. In some implementations, wherein at least one of the DSCP service class markings or the service specific IPv6 network prefix identifies the return service specific packets for enhanced service levels as the service specific packets traverse the service provider network between the border relay and the access device.

In some implementations, a method for providing differentiated services using Mapping of Address and Port using translation (MAP-T) includes receiving, by a customer premise equipment (CPE) from a service provider system, a service specific IPv6 network prefix and a service specific basic mapping rule, the service specific IPv6 network prefix associated with an enhanced service level, identifying, by the CPE, service packets associated with the enhanced service level, translating, by the CPE, the identified service packets to the service specific IPv6 network prefix using the service specific basic mapping rule to generate service specific packets, forwarding, by the CPE, the service specific packets to an internal endpoint service in a service provider network, and transmitting, by the internal endpoint service to the CPE, return packets with the enhanced service level using an aggregate IPv6 prefix which matches a client destination endpoint address. In some implementations, wherein the service specific basic mapping rule is a MAPT-T basic mapping rule. In some implementations, the method further includes traversing the service provider network between the CPE and the internal endpoint service, wherein the service provider network provides the enhanced service level to the service specific packets due to the service specific IPv6 network prefix. In some implementations, wherein the identifying identifies at least one of a port number, a destination address, a special private IP address allocation, or by using authentication, authorization, and accounting (AAA) techniques. In some implementations, wherein the translating further includes generating dual stack packets using the identified service packets and the service specific IPv6 network prefix. In some implementations, the method further includes marking, by an edge device, the service specific packets with differentiated services code point (DSCP) service class markings based on the service specific IPv6 network prefix. In some implementations, the transmitting further includes marking, by the internal endpoint service, the service specific packets with differentiated services code point (DSCP) service class markings based on the service specific IPv6 network prefix. In some implementations, at least one of the DSCP service class markings or the service specific IPv6 network prefix identifies the return service specific packets for the enhanced service level as the service specific packets traverse the service provider network between the internal endpoint service and the CPE.

In some implementations, a service provider system includes a service provider network, at least one border relay, and a provisioning server configured to provision a service specific IPv6 network prefix and a service specific basic mapping rule to an access device and to provision a service specific mapping rule or a service specific aggregation classifier to the border relay, service packets identified with the service specific IPv6 network prefix traverse the service provider network as service specific packets which were translated by the access device to the service specific IPv6 network prefix using the service specific basic mapping rule, the service provider network is configured to provide enhanced service levels to the service specific packets due to the service specific IPv6 network prefix, and the border relay is configured to translate return packets to service specific return packets using the service specific mapping rule or the service specific aggregation classifier.

In some implementations, the service specific basic mapping rule is a MAPT-T basic mapping rule. In some implementations, the service specific packets or the service specific return packets are marked with differentiated services code point (DSCP) service class markings based on the service specific IPv6 network prefix or service specific aggregation classification.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more the computer readable mediums having the computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software packet, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A method for providing differentiated services using Mapping of Address and Port using translation (MAP-T), the method comprising:
   receiving, by an access device from a provisioning server, service specific IPv6 network prefixes and a service specific basic mapping rule for the service specific IPv6 network prefixes, each service specific IPv6 network prefix associated with a different differentiated network service level;
   receiving, by a border relay from the provisioning server, at least one of a service specific mapping rule or a service specific aggregation classifier for the service specific IPv6 network prefixes;
   identifying, by the access device, service packets associated with a differentiated network service level;
   translating, by the access device, the identified service packets to a service specific IPv6 network prefix using the differentiated network service level and the service specific basic mapping rule to generate service specific packets;
   forwarding, by the access device, the service specific packets to the border relay;
   translating, by the border relay, return packets to service specific return packets using the service specific mapping rule or the service specific aggregation classifier;
   marking, by the border relay, the service specific return packets with differentiated services code point (DSCP) service class markings based on the service specific IPv6 network prefix, wherein at least one of the DSCP service class markings or the service specific IPv6 network prefix identifies the service specific return packets for enhanced service levels as the service specific return packets traverse a service provider network between the border relay and the access device; and
   forwarding, by the border relay to the access device, the service specific return packets.

2. The method of claim 1, wherein the service specific basic mapping rule is a MAP-T basic mapping rule.

3. The method of claim 1, wherein the forwarding further comprising: traversing a service provider network between the access device and the border relay, wherein the service provider network provides an enhanced service level to the service specific packets due to the service specific IPv6 network prefix.

4. The method of claim 1, wherein the service specific IPv6 network prefix identifies the service specific packets for enhanced service levels as the service specific packets traverse a service provider network between the access device and the border relay.

5. The method of claim 1, wherein the identifying identifies at least one of a port number, a destination address, a special private IP address allocation, or by using authentication, authorization, and accounting (AAA) techniques.

6. The method of claim 1, further comprising: generating dual stack packets using the identified service packets and the service specific IPv6 network prefix.

7. The method of claim 1, further comprising: marking, by an edge device, the service specific packets with differentiated services code point (DSCP) service class markings based on the service specific IPv6 network prefix.

8. A method for providing differentiated services using Mapping of Address and Port using translation (MAP-T), the method comprising:
   receiving, by a customer premise equipment (CPE) from a service provider system, a service specific IPv6 network prefix and a service specific basic mapping rule, the service specific IPv6 network prefix associated with an enhanced service level;
   identifying, by the CPE, service packets associated with the enhanced service level;
   translating, by the CPE, the identified service packets to the service specific IPv6 network prefix using the service specific basic mapping rule to generate service specific packets;
   forwarding, by the CPE, the service specific packets to an internal endpoint service in a service provider network;
   marking, by the internal endpoint service, return packets with differentiated services code point (DSCP) service class markings based on the service specific IPv6 network prefix, wherein at least one of the DSCP service class markings or the service specific IPv6 network prefix identifies the return packets for the enhanced service level as the return packets traverse a service provider network between the internal endpoint service and the CPE; and
   transmitting, by the internal endpoint service to the CPE, the return packets with the enhanced service level using an aggregate IPv6 prefix which matches a client destination endpoint address.

9. The method of claim 8, wherein the service specific basic mapping rule is a MAP-T basic mapping rule.

10. The method of claim 8, further comprising: traversing the service provider network between the CPE and the internal endpoint service, wherein the service provider network provides the enhanced service level to the service specific packets due to the service specific IPv6 network prefix.

11. The method of claim 8, wherein the identifying identifies at least one of a port number, a destination address, a special private IP address allocation, or by using authentication, authorization, and accounting (AAA) techniques.

12. The method of claim 8, wherein the translating further comprises:
generating dual stack packets using the identified service packets and the service specific IPv6 network prefix.

13. The method of claim 8, further comprising:
marking, by an edge device, the service specific packets with differentiated services code point (DSCP) service class markings based on the service specific IPv6 network prefix.

14. A service provider system comprising:
a service provider network;
at least one border relay; and
a provisioning server configured to provision service specific IPv6 network prefixes and a service specific basic mapping rule for the service specific IPv6 network prefixes to an access device and to provision a service specific mapping rule or a service specific aggregation classifier for the service specific IPv6 network prefixes to the at least one border relay,
wherein service packets identified with one of the service specific IPv6 network prefixes traverse the service provider network as service specific packets which were translated by the access device to the one service specific IPv6 network prefix using the service specific basic mapping rule,
wherein the service provider network is configured to provide enhanced service levels to the service specific packets due to the one service specific IPv6 network prefix,
wherein the at least one border relay is configured to translate return packets to service specific return packets using the service specific mapping rule or the service specific aggregation classifier,
wherein the at least one border relay is configured to mark the service specific return packets with differentiated services code point (DSCP) service class markings based on the one service specific IPv6 network prefix, and
wherein at least one of the DSCP service class markings or the one service specific IPv6 network prefix identifies the service specific return packets for enhanced service levels as the service specific return packets traverse the service provider network between the at least one border relay and the access device.

15. The service provider system of claim 14, wherein the service specific basic mapping rule is a MAP-T basic mapping rule.

16. The service provider system of claim 14, wherein the service specific packets or the service specific return packets are marked with DSCP service class markings based on service specific aggregation classification.

* * * * *